Oct. 20, 1959 F. G. BUHRENDORF 2,909,257
CLUTCH FOR DRIVING APPARATUS
Filed Dec. 20, 1955
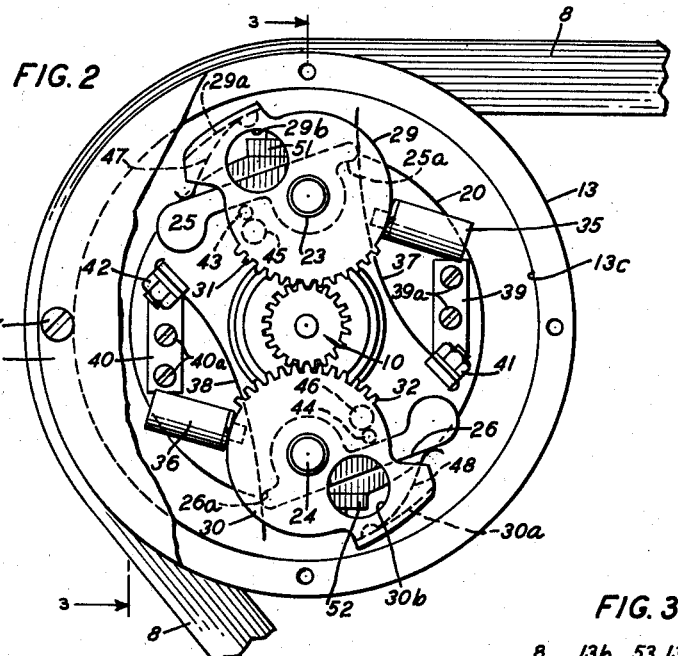
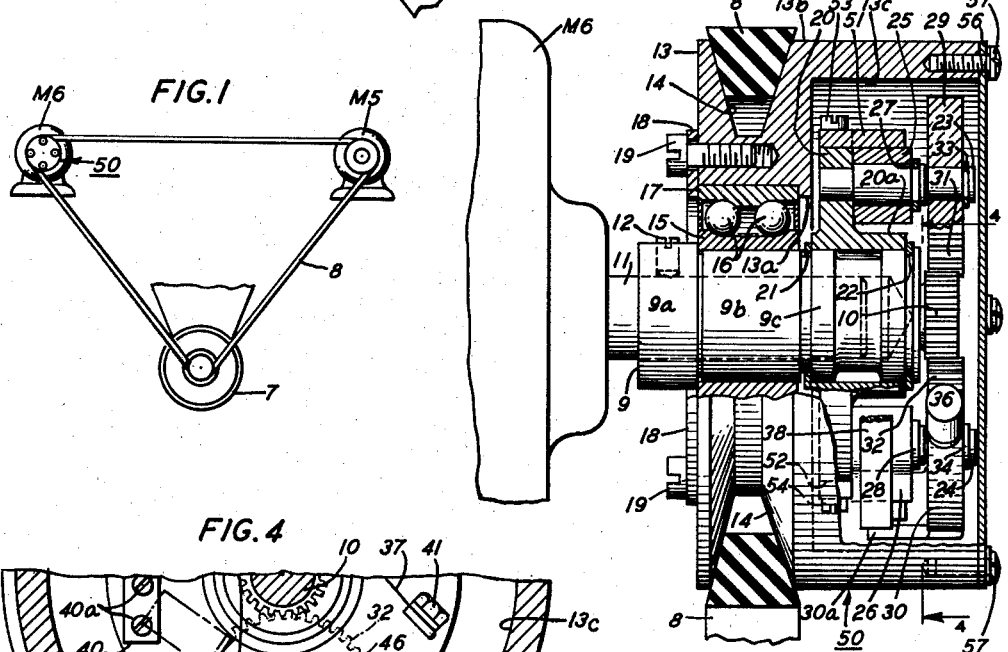
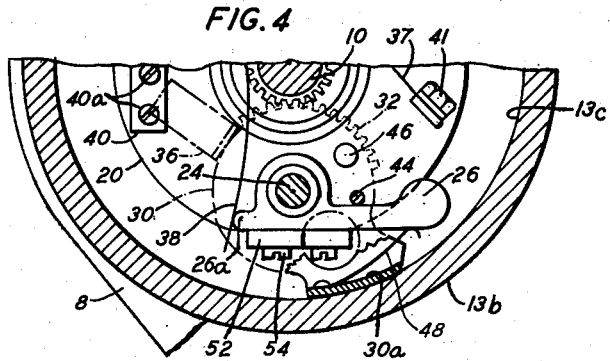
INVENTOR
F. G. BUHRENDORF
BY
ATTORNEY 2,909,257

CLUTCH FOR DRIVING APPARATUS

Frederick G. Buhrendorf, Westfield, N.J., assignor to Bell Telephone Laboratories, Incorporated, New York, N.Y., a corporation of New York Application December 20, 1955, Serial No. 554,246

7 Claims. (Cl. 192—105)

This invention relates, in general, to torque transmission apparatus and more particularly to improvements in clutch mechanisms which operate automatically responsive to certain prerequisite conditions.

The clutch mechanism of the character contemplated in this invention may be used in connection with any application in which it is desirous on occasion to clutch in an auxiliary drive motor to already operating apparatus. Particularly, the advantages of the present clutch mechanisms are demonstrated, for example, when used in connection with the rotating apparatus for a magnetic information storage drum of a memory system. As is well known, it is highly important in such a system that the magnetic drum be rotated continuously and that this rotation be maintained without interruption. Accordingly, in such a memory system, an auxiliary drive motor is provided in addition to a main drive motor which normally drives the drum by means of a belt, which belt also couples the auxiliary drive motor to the drum.

Separate sources of potential are normally provided for the main drive motor and the auxiliary drive motor and upon the failure of the source of potential for the main drive motor, the auxiliary drive motor must be clutched in to assume the rotation of the storage drum without interrupting its rotation. The torque generated by the auxiliary drive motor, therefore, must be smoothly and positively applied to the moving drive belt. Further, when the potential is restored for the main drive motor and this motor resumes the rotation of the drum, it is highly desirable that the auxiliary drive motor be automatically disengaged to prevent undue wear on the auxiliary motor elements. To effect this disengagement, any clutch mechanism utilized must disengage responsive to relatively light operating forces, since the only forces available to accomplish this automatic disengagement are the frictional forces exerted by the brushes and bearings of the auxiliary motor when this latter motor is deenergized.

Accordingly, it is an object of this invention to provide a new and novel clutch mechanism which will positively and instantly couple a rotating driving motor to a driven member upon certain predetermined operating conditions and to disengage the driving motor from the driven member upon the deenergization of the driving motor.

An important feature of this invention is an arrangement whereby the centrifugal force developed by the rotating elements and the accelerating torque of the energized auxiliary motor combine to insure engagement of the clutch only at a predetermined time and whereby any retarding action, for example the retarding friction of the motor bearings and brushes, will serve to disengage the clutch.

Broadly, the above objects and features are realized in accordance with this invention by means of a pair of planetary gear elements rotatable about and meshed with a gear terminating the auxiliary motor shaft. Each of the planetary gear elements is maintained in a normal position by spring means and is provided with a shoe adapted to be rotated into frictional contact with the driven element, which in one specific illustrative embodiment may be the inner cylindrical surface of a drum pulley. When the auxiliary drive motor is energized, the accelerating torque acting through the drive gear tends to rotate the planetary gear elements and hence the shoes into contact with the drum pulley. In addition, a pair of counterweights individually associated with the shoes also urges the shoes into engagement with the pulley. When the centrifugal force exerted by the counterweights together with the accelerating torque of the drive motor is sufficient to overcome the bias of the spring means, the shoes are rotated toward the inner surface of the drum pulley.

When contact of the surface is made by the shoes the configuration of the contacting surface of the shoe is such that when a force acting upon the shoes normal to the inner surface of the drum pulley is applied the shoes will be positively locked to the drum pulley. This force is provided by the relatively small drive gear through the gear teeth and is amplified in accordance with the mechanical arrangement of the drive gear and the larger planetary gears. This self-engaging action thus provides the means whereby the torque of the auxiliary drive motor is transmitted to the driven pulley.

When the auxiliary drive motor is deenergized, a relative reverse torque with respect to the torque applied to the pulley is produced by the retarding friction of the brushes and bearings of the motor and this reverse torque is also transmitted through the drive gear to the planetary gear elements. Because of the arrangement of the planetary gearing a very small reverse force such as that provided by this retarding friction and amplified when exerted on the shoes through the gear teeth is sufficient to free the locked shoes from engagement with the driven pulley and allow the spring means to return the shoes to their normal positions.

The present invention is described herein as utilized in connection with an auxiliary driving apparatus for assuring the continuous rotation of a magnetic information storage drum. However, it is to be understood that the clutch mechanism of this invention may be applied in connection with any apparatus having similar operating requirements.

This invention, together with further objects and features thereof, will be readily understood from the detailed description which follows when taken in connection with the accompanying drawings in which:

Fig. 1 shows an illustrative arrangement of an auxiliary drive motor, main drive motor, and apparatus to be rotated, with the clutch mechanism of this invention associated with the auxiliary drive motor;

Fig. 2 is a plan view of a clutch mechanism illustrative of one specific embodiment of this invention, with a portion of the cover plate broken away to show the structural details of the mechanism;

Fig. 3 is a sectional view of the clutch mechanism of Fig. 2 along the line 3—3 thereof, showing its manner of installation on the driving shaft of an auxiliary motor and further showing the relation of the elements; and Fig. 4 is a sectional view taken along the line 4—4 of Fig. 3 and shows the details of one of the counterweights and its association with one of the clutch shoes, the shoe being depicted in Fig. 4 in operating engagement with the pulley.

An illustrative arrangement of a main drive motor M5, an auxiliary drive motor M6 having installed thereon a clutch 50, in accordance with this invention and driven apparatus 7, which for purposes of illustration may be a magnetic drum, are shown in Fig. 1. These elements are operatively connected by means of a common belt 8 normally driven by the main drive motor M5.

3

The elements of a clutch constructed in accordance with the present invention are rotatively mounted upon and operatively associated with a central hub 9, seen in Fig. 3, which hub 9 is divided into the sections 9a, 9b and 9c, and is terminated in a spur gear 10. The hub 9, in turn, is drilled to slidably fit about a shaft 11 of an auxiliary drive motor M6 and is rigidly secured to said shaft 11 in any convenient manner, such as by a setscrew 12 located in the portion 9a of the hub. A cylindrical pulley 13 having an annular slot 14 is adapted to rotate about the hub 9 under the driving force of the belt 8. The belt 8, which may conveniently be a V-belt as shown, is adapted to ride in the slot 14 provided therefor and is normally driven under the power of the main drive motor M5. To reduce rotating friction of the pulley 13 to a minimum, a bearing assembly comprising an inner race 15, balls 16, and an outer race 17 is seated on the portion 9b of the hub, the outer race 17 being firmly seated against an annular abutment 13a by a retaining washer 18, which washer 18 may be secured to the pulley 13 proper by retaining screws 19. By the means just described, the pulley 13 is free to rotate about the hub 9 and the hub 9 and motor shaft 11 may be freely rotated independently of any torque applied to the pulley 13.

The cylindrical portion 13b of the pulley 13 serves as an enclosure for the operating elements of the clutch and provides on its inner surface 13c a clutching surface for clutch shoes hereinafter to be described. The operating elements include a circular mounting plate 20 which, by means of a hub 20a, is freely rotatable about the 9c portion of the hub 9. A pair of retaining rings 21 and 22 fitted into annular slots provided therefor in the hub 9 maintains the plate 20 in a suitable longitudinal relation with the pulley 13. The portion 9c of the hub is undercut as shown to minimize rotating friction with the flanged portion 20a.

Diametrically opposing each other as clearly shown in Fig. 2 are a pair of shafts 23 and 24 rigidly secured on the mounting plate 20 in any convenient manner such as by riveting. A pair of counterweights 25 and 26 are rotatably mounted on the respective shafts 23 and 24 such that weights of each extend in a counterclockwise direction as viewed in Fig. 2. Any rotation of the plate 20 will thereby cause the centrifugal force acting upon the weights to urge the counterweights 25 and 26 in a clockwise direction as viewed in the same figure. A pair of retaining rings 27 and 28, Fig. 3, seated in annular slots provided therefor in each of the shafts 23 and 24, respectively, maintain the counterweights 25 and 26 in position on the respective shafts.

Also rotatably mounted on the shafts 23 and 24 and adjacent to the counterweights 25 and 26 is a pair of planetary gear elements 29 and 30. A segment of each of the elements 29 and 30 is provided with gear teeth 31 and 32, which teeth are adapted to engage the teeth of the gear 10 terminating the hub 9. The elements 29 and 30 ride against shoulders provided in the shafts 23 and 24 and are maintained in position on the shafts 23 and 24 by means of spring clips 33 and 34 seating in annular slots provided therefor in the respective shafts 23 and 24. The elements 29 and 30 each has provided thereon respective flanges 29a and 30a, turned at right angles to the plane of the elements 29 and 30 to form clutch shoes. The flanges 29a and 30a are so formed that when the planetary elements 29 and 30 are rotated in a clockwise direction as viewed in Fig. 2 with respect to the mounting plate 20, the flanges 29a and 30a make contact with the clutching surface 13c of the pulley 13. Dynamic balance of the elements 29 and 30 is attained by proper distribution of mass through the addition of the counterweights 35 and 36 and the displacement at the apertures 29b and 30b, respectively.

The operating elements of the clutch 50 are maintained in a normal relationship by a pair of flat springs 37 and 38 affixed, respectively, to mounting brackets 39 and 40 as by screws 41 and 42. The brackets 39 and 40 in turn may be secured to the plate 20 in any convenient manner, such as by the screws 39a and 40a. The springs 37 and 38 are so placed as to engage the lugs 25a and 26a of the counterweights 25 and 26, respectively, thereby normally urging the counterweights 25 and 26 in a counterclockwise direction as viewed in Fig. 2 against stud pins 43 and 44, respectively, staked in the elements 29 and 30. The stud pins 43 and 44 in turn are normally held in contact with pins 45 and 46, respectively, staked in the mounting plate 20. Thus, the counterweights 25 and 26 are positively prevented from any counterclockwise movement as viewed in Fig. 2 by the pins and are biased against clockwise movement by the action of the flat springs 37 and 38.

Additionally, clockwise movement of the counterweights 25 and 26 is resisted by flat spring elements 47 and 48 riveted to the inner surfaces of the flanges 29a and 30a as most clearly shown in Fig. 4. The clockwise travel of the counterweights 25 and 26 is limited, respectively, by stops 51 and 52 mounted diametrically opposing on the periphery of the mounting plate 20 by the screw means 53 and 54.

The clutch assembly 50 is completed by a cover plate 56 secured in position by the screw means 57.

Turning now to the operation of the clutch mechanism 50, it will be assumed for purposes of description that the pulley 13 is being driven in a counterclockwise direction as viewed in Figs. 1 and 2 by the main drive motor M5 through the belt 8. As the main drive motor M5 is cut out and the auxiliary drive motor M6 is cut in, the shaft 11 and hub 9 will begin to rotate also in the counterclockwise direction. The torque applied by the shaft 11 and thereby the gear 10 is transmitted to the planetary gear elements 29 and 30 by means of the respective gear teeth 31 and 32. The gear elements 29 and 30 will thereby be urged in a clockwise direction as viewed in Fig. 2 to bring the shoe flanges 29a and 30a, respectively, into contact with the clutching surface 13c of the cylindrical pulley 13.

In addition, the inertia of the planetary gear elements 29 and 30 encountered by the rotational drive of the gear 10 will cause the mounting plate 20 to rotate in the counterclockwise direction to thereby exert a centrifugal force on the counterweights 25 and 26 urging these elements in the clockwise direction. When the centrifugal force generated by the rotation of the mounting plate 20 increases beyond the counter force exerted by the bias of the springs 37 and 38 restraining the counterweights 25 and 26, respectively, the gear elements 29 and 30 and thereby the shoe flanges 29a and 30a will be additionally urged in the clockwise direction. Two forces thus combine to move shoe flanges 29a and 30a into engagement with the surface 13c of the pulley 13, the one becoming operative when the mounting plate 20 and the motor shaft 11 have attained a predetermined rotational speed as controlled by the bias of the flat springs 37 and 38. The shoe flanges 29a and 30a are so formed and the direction of rotation of the pulley 13 and energized motor M6 is such that the flanges 29a and 30a are locked in position due to the force exerted by drive gear 10 as described hereinbefore during the time that the motor M6 is exerting a driving torque. The torque of the motor M6 is thus smoothly and positively transferred to the pulley 13 which may now, by means of the belt 8, assume the driving of the apparatus 7 to be operated.

When the main drive motor M5 resumes operation and the auxiliary drive motor M6 is cut out, the friction produced by elements of the auxiliary motor M6 such as, for example, that of bearings and brushes, will generate a reverse torque relative to that produced by the pulley 13 which is now again driven by the main motor M5. This reverse torque will be transferred by means of the gear 10 to the planetary gear elements 29 and 30 which are now urged in a counterclockwise direction as viewed in Fig. 2, the operation of the rotating clutching surface 13c of the pulley 13 now being such as to instantly release the shoe flanges 29a and 30a. The form of the shoe flanges 29a and 30a is such that ordinarily their action would be to lock with ever increasing force as the mounting plate 20 is accelerated and the centrifugal force acts upon the counterweights 25 and 26. To effect an instant release when the auxiliary motor M6 is cut out, the travel of the counterweights 25 and 26 is limited by the stops 51 and 52, respectively, thereby limiting to a predetermined value the locking force which will be transferred to the shoe flanges 29a and 30a by the springs 47 and 48, respectively, the predetermined value being set at a point which will permit instant release of the shoe flanges 29a and 30a as described above.

The action of the springs 37 and 38 will restore the operating elements to their normal positions and the pulley 13 is now free to rotate independently of the auxiliary motor M6.

While what has been described is considered to be the preferred embodiment of the present invention, it is to be understood that changes and modifications may be made in the structure and arrangement of the elements therein without departing from the scope of the invention.

What is claimed is:

1. A clutch mechanism comprising a rotatable first member terminating in a drive gear, a driven second member coaxially rotatable with respect to said first member, mounting means rotatably mounted coaxially on said first member and rotatable with respect to said driven second member, a plurality of planetary gear means rotatably mounted on said mounting means and meshed with said driving gear, means for rotating said mounting means including said drive gear and said planetary gear means, a plurality of centrifugally responsive members mounted on said mounting means and rotatable respectively with said plurality of planetary gear means, a plurality of contacting means integral respectively with said planetary gears and adapted to engage said driven second member, and a plurality of spring means fixed respectively to said contacting means engageable by said centrifugally responsive members for urging the rotation of said planetary gears in one direction when said rotatable first member is rotated in the opposite direction, said spring means being tensioned to permit the rotation of said planetary gears in the opposite direction only when the centrifugal force on said centrifugally responsive members falls below a predetermined magnitude.

2. A clutch mechanism as claimed in claim 1 also comprising a second plurality of spring means mounted on said mounting means adapted respectively for biasing said centrifugally responsive members in a normal inoperative position, said last-mentioned spring means being tensioned to permit rotation by said centrifugally responsive members only upon a predetermined centrifugal force on said last-mentioned members.

3. A clutch mechanism comprising a rotatable member including a gear, a pulley mounted on said rotatable member for rotation therearound, said pulley including a cylindrical inner surface, a mounting plate rotatably supported on said rotatable member and rotatable with respect to said pulley, a pair of shafts secured to said mounting plate, centrifugally responsive means rotatably mounted on each of said shafts, a gear element mounted on each of said shafts, each of said gear elements being independently rotatable with respect to said centrifugally responsive means and each having teeth mating with said first-mentioned gear and clutch shoes integral with the gear element and adapted to engage said cylindrical inner surface, and means affixed to each of said gear elements engaging respectively said centrifugally responsive means for urging the rotation of said gear elements responsive to the rotation of said centrifugally responsive means.

4. A clutch mechanism in accordance with claim 3, further comprising spring means supported by said mounting plate and engaging said centrifugally responsive means to bias said last-mentioned means to their normal inoperative position.

5. A clutch mechanism in accordance with claim 3 in which said last-mentioned means includes a spring means being tensioned so as to permit the rotation of said gear elements in one direction only upon a predetermined centrifugal force on said centrifugally responsive means.

6. A clutch mechanism in accordance with claim 3, wherein said gear elements each have provided thereon counterbalancing means for counterbalancing said gear elements against centrifugal forces.

7. A clutch mechanism comprising a rotatable member including a gear, a pulley rotatably mounted on said rotatable member, said pulley including a cylindrical inner surface, a mounting plate rotatably supported on said rotatable member and rotatable with respect to said pulley, a pair of shafts secured to said mounting plate, a centrifugally responsive means and a gear element independently rotatably mounted on each of said shafts, each of said gear elements having teeth mating with said first-mentioned gear, a clutch shoe affixed to the gear element and adapted to engage said cylindrical inner surface, and counterbalancing means provided thereon for counterbalancing said gear elements against centrifugal forces; first spring means supported by said mounting plate and second spring means supported by said clutch shoes, both of said spring means cooperating with said centrifugally responsive means to bias said centrifugally responsive means in their normal inoperative position, and stop means mounted on said mounting plate to determine the travel of said centrifugally responsive means.

References Cited in the file of this patent

UNITED STATES PATENTS

| 1,610,794 | Keller | Dec. 14, 1926 |
| 1,978,834 | Cotterman | Oct. 30, 1934 |
| 2,318,433 | Stechbart | May 4, 1943 |
| 2,373,462 | Crow | Apr. 10, 1945 |

FOREIGN PATENTS

| 831,243 | France | May 30, 1938 |
| 930,427 | Germany | July 14, 1955 |